United States Patent
Bohnstedt

(10) Patent No.: US 8,251,852 B2
(45) Date of Patent: Aug. 28, 2012

(54) ARRANGEMENT WITH AT LEAST ONE HYDRAULICALLY BIDIRECTIONAL ACTUATABLE SWITCHING ELEMENT

(75) Inventor: Thore Bohnstedt, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 254 days.

(21) Appl. No.: 12/779,086

(22) Filed: May 13, 2010

(65) Prior Publication Data
US 2010/0311532 A1 Dec. 9, 2010

(30) Foreign Application Priority Data
Jun. 4, 2009 (DE) .......................... 10 2009 026 709

(51) Int. Cl.
*F16H 57/04* (2010.01)

(52) U.S. Cl. ...................................................... 475/159
(58) Field of Classification Search ............... 192/113.5; 475/159; 184/6.1
See application file for complete search history.

(56) References Cited

U.S. PATENT DOCUMENTS

| | | | | |
|---|---|---|---|---|
| 4,935,872 A * | 6/1990 | Benford et al. | .................. | 701/51 |
| 5,230,664 A * | 7/1993 | Michioka et al. | ............... | 474/43 |
| 5,667,330 A | 9/1997 | Henkel et al. | | |
| 6,244,385 B1 * | 6/2001 | Tsubata et al. | .................. | 184/6.4 |
| 6,830,527 B2 * | 12/2004 | Wakayama | ................... | 475/161 |
| 7,247,112 B2 * | 7/2007 | Foster et al. | ...................... | 475/5 |
| 7,396,308 B2 * | 7/2008 | Tabata et al. | .................. | 475/159 |
| 7,578,761 B2 * | 8/2009 | Nishikawa et al. | ............. | 475/127 |
| 7,854,675 B2 * | 12/2010 | Grochowski | ................... | 475/116 |
| 7,985,154 B2 * | 7/2011 | Day et al. | ...................... | 475/159 |
| 2009/0143182 A1 * | 6/2009 | Thomas et al. | ............... | 475/159 |

FOREIGN PATENT DOCUMENTS

GB 2 368 102 A 4/2002

* cited by examiner

*Primary Examiner* — Dirk Wright
(74) *Attorney, Agent, or Firm* — Davis & Bujold, P.L.L.C.

(57) ABSTRACT

An arrangement with at least one shifting element (2) arranged within a housing (1) of a transmission which can be hydraulically acted upon with a pressure medium from a pressure medium supply for the purpose of being coupled to and decoupled from at least one component of the transmission. The pressure medium supply to the shifting element (2) is additionally used for the continuous supply of at least one of lubricant and coolant to at least one other structural element arranged within the housing (1) of the transmission.

10 Claims, 1 Drawing Sheet

ARRANGEMENT WITH AT LEAST ONE HYDRAULICALLY BIDIRECTIONAL ACTUATABLE SWITCHING ELEMENT

This application claims priority from German patent application serial no. 10 2009 026 709.3 filed Jun. 4, 2009.

FIELD OF THE INVENTION

The present invention concerns a shifting element that can be hydraulically actuated in two directions.

BACKGROUND OF THE INVENTION

From automotive technology, arrangements are known, which comprise at least one claw clutch as a shifting element for connecting a shaft of a transmission to a component. For example, the document GB 2 368 102 A describes an automatic transmission with a device for decoupling the transmission from a drivetrain of a motor vehicle. The device is in the form of a claw clutch, which is actuated hydraulically by means of an actuating piston arranged inside a shaft. The actuating piston is acted upon by pressure on one side in order to be moved in opposition to a restoring spring. To actuate the shifting claw a shifting finger coupled to the actuating piston is used, which passes through a cut-out in the shaft.

Further, from the document U.S. Pat. No. 5,667,330 A another arrangement with a claw clutch as a shifting element is known. In this known arrangement the claw clutch is used in order to connect a power take-off shaft to a transmission output shaft of a tractor. For this, an actuating piston inside the output shaft is acted upon hydraulically on one side against a restoring spring, and the shifting claw is actuated by a bolt which passes from the actuating piston to the shifting claw through a cut-out in the output shaft.

In these known arrangements, besides the supply of pressure medium for the hydraulic actuation of the claw clutch, an additional supply of lubricant and/or coolant is needed, in particular for the bearings in the transmission.

SUMMARY OF THE INVENTION

The purpose of the present invention is to provide an arrangement of a shifting element that can be actuated hydraulically from both sides, which is as neutral as possible in terms of structural installation space and which also reduces the structural complexity of the lubricant and/or coolant supply.

Accordingly an arrangement is proposed, with at least one shifting element arranged in a housing of a transmission, which can be acted upon hydraulically with pressure medium from a pressure medium supply both to couple and also to decouple at least one transmission component—i.e. it can be actuated hydraulically on both sides—in which the pressure medium supply to the shifting element is, in addition, used to provide a continuous supply of lubricant and/or coolant to at least one other structural element which is also arranged in the housing of the transmission.

Advantageously, this makes it possible to omit the otherwise necessary ducts and lines that connect the housing to the separate lubricant and/or coolant supply required for lubricating and/or cooling the other structural elements, so that the structural complexity and corresponding costs for the provision of lubricant and/or coolant in the transmission are substantially reduced.

In a preferred embodiment of the invention it is provided that the shifting element actuated on both sides can be acted upon by a pressure medium—for example oil or suchlike—via a first supply duct for coupling and via a second supply duct for decoupling, in such manner that these two supply ducts of the shifting element can in addition both be used to provide a continuous supply of lubricant and/or coolant to at least one bearing point in the housing of the transmission. Thus, the pressure medium supply of the shifting element can also be used in a very simple manner for supplying lubricant and/or coolant to another transmission component as well.

Preferably, in this way each supply duct is connected to the same bearing points of the transmission by at least one duct for lubricating and/or cooling.

Since, in the case of the shifting element hydraulically actuated on both sides, during operation either the first supply duct or the second supply duct is acted upon with pressure medium, taken together these supply ducts can additionally also ensure a continuous feed of lubricant and/or coolant to the bearing point through the ducts or branches provided.

According to a related feature of the invention, the shifting element can be arranged essentially radially inside a bearing support of the transmission or suchlike. In this way a shifting element that is as neutral as possible in relation to structural space can be produced, in particular for an automatic transmission designed for example as a planetary gear transmission. However, the proposed arrangement can also be used in other transmissions as well. By virtue of the arrangement in the area of the bearing support, the existing structural space in the transmission housing can be used in an optimal manner.

Preferably, in this case the first supply duct connects the pressure medium supply to a pressure space associated with a first surface of the shifting element to be acted upon and the second supply duct connects the pressure medium supply to a pressure space associated with a second surface of the shifting element to be acted upon, in such manner that the respective supply ducts pass separately, radially through the bearing support. For example, the supply ducts can be arranged with an offset relative to one another in the circumferential direction of the bearing support, and each can have an axially extending duct section, these being connected with the associated duct for lubricating and/or cooling the bearing point. Other designs too are possible, in particular of the supply ducts, which ensure separate supplying of the pressure spaces and at the same time provide a continuous supply to the bearings that have to be lubricated and cooled.

Moreover, in the proposed arrangement the shifting element can be arranged radially outside on a shaft, for example a drive input shaft of the transmission or suchlike, in such manner that it can be axially displaced. To fix the transmission component the shifting element can be attached in a rotationally fixed manner on the bearing support of a gearwheel or fixed to the housing. Thus, by means of the shifting element any desired gearset element of the transmission can be fixed. Preferably a component of a planetary gearset such as a sun gear can also be connected to the housing and released therefrom by means of the shifting element. For this it can be provided that the shifting element that can be actuated hydraulically on both sides, in its engaged position, is connected to the component to be fixed, such as the sun gear by coupling teeth, spline teeth or suchlike.

The shifting element can be in the form either of an interlock-type or a frictional shifting element, for example configured as a claw clutch, a disk clutch or a conical clutch, or a claw brake, a disk brake or a conical brake. The essential feature of the shifting element's design here is only that both for disengagement and for engagement the shifting element, a respective dedicated hydraulic actuating device must be present.

If the shifting element is made as a claw clutch or claw brake, the number of components in the transmission can be reduced further since the shifting claw and the actuating piston of the claw clutch or claw brake can be made as an integral component.

BRIEF DESCRIPTION OF THE DRAWINGS

Below, the present invention is explained in more detail with reference to the drawings, which show.

DETAILED DESCRIPTION OF THE PREFERRED EMBODIMENTS

Figure 1:
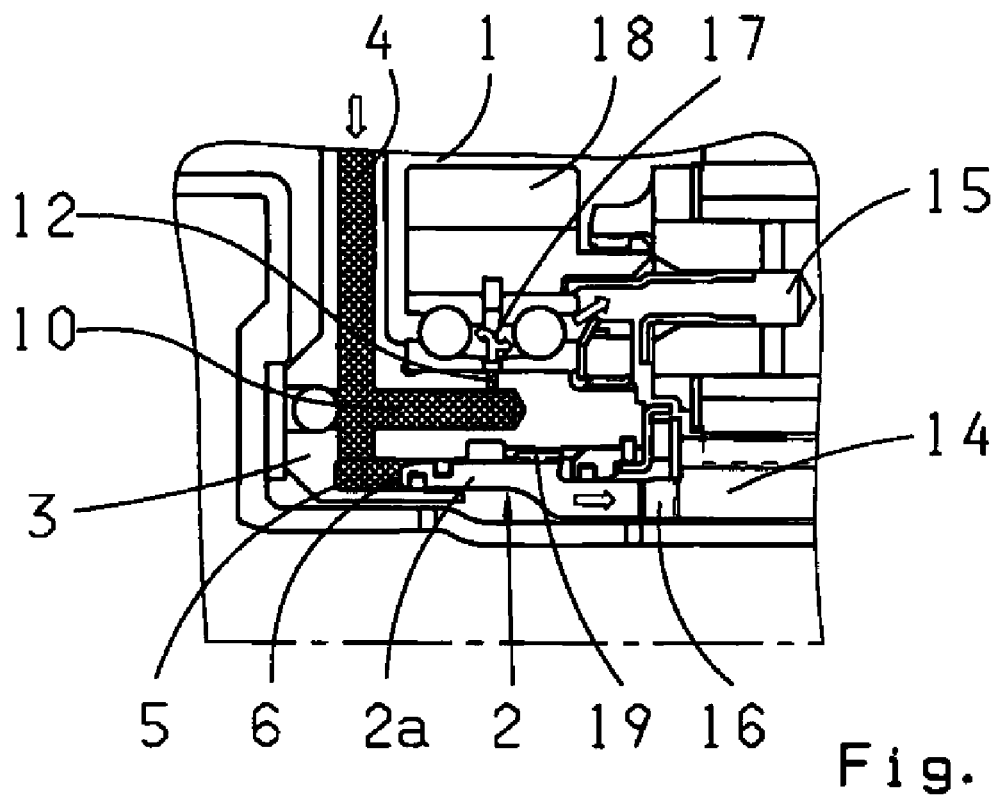
FIG. 1: Schematic, sectioned partial view of an example arrangement according to the invention, with an interlock-type shifting element that can be actuated hydraulically on both sides, in a position coupled to a component of a transmission.

The figures show an example of a possible embodiment variant of an arrangement according to the invention, considering the example of a shifting element 2 in the form of a claw clutch in a housing 1 of an automatic transmission with a planetary structure, such that the shifting element 2 is acted upon hydraulically by a pressure medium (such as oil) from a pressure medium supply, both for coupling to and for decoupling from at least one component of the transmission. In the figures, the same components are indexed with the same numbers.

According to the invention, it is provided that the pressure medium supply for the hydraulic actuation of the shifting element 2 is in addition provided for the continuous supply of lubricant and/or coolant for at least one further structural element in the housing 1, so that there is no need for a separate lubricant and/or coolant supply for the further structural element and the additional ducts and lines required for such a supply can be omitted.

A shifting claw 2a of the shifting element 2 in the example arrangement proposed, at the same time constitutes the actuating piston for the hydraulic actuation, which is essentially arranged radially inside a bearing support 3 fixed on the housing and is connected thereto by spline teeth 19, rotationally fixed but able to move axially. For the supply of pressure medium a first pressure medium supply duct 4 is provided, which supplies a pressure space 5 with pressure medium in order to act upon a first surface 6 of the shifting claw 2a with pressure medium. In addition, a second pressure medium supply duct 7 is provided, which supplies a pressure space 8 with pressure medium in order to act upon a second surface 9 of the shifting claw 2a with pressure medium.

The two supply ducts 4, 7 extend approximately radially through the bearing support 3, the supply ducts 4, 7 being positioned offset relative to one another in the circumferential direction of the bearing support 3 so that the separate supply ducts 4, 7 can be formed. In addition, the supply ducts 4, 7 have respective duct sections 10, 11 that extend essentially axially, and these are respectively connected to associated ducts 12, 13 which deliver the pressure medium to predetermined transmission bearings so that the bearings are lubricated and cooled by the pressure medium. In the example illustrated the first of these bearings is a bearing 17 of a gearwheel 18.

By virtue of the supply ducts 4, 7 the shifting claw 2a can be moved back and forth between its coupled or engaged position and its decoupled or disengaged position, as indicated in the figures by corresponding arrows.

In the embodiment variant of the arrangement shown, the shifting element 2 or its shifting claw 2a is used to fix or to release a sun gear 14 of a planetary gearset 15 of the automatic transmission. For this purpose the shifting claw 2a and the corresponding matching part provided on the sun gear 14 have common coupling teeth 16, in this case for example formed as crown teeth.

FIG. 1 shows the coupled or engaged position of the shift element 2, in which, owing to the pressure exerted on the first surface 6 via the first supply duct 4, the shifting claw 2a is pushed to the right in the plane of the drawing. At the same time, pressure medium can also flow through the axial duct section 10 and the associated duct 12 to the bearing 17 of the gearwheel 18 in order to lubricate and cool it. Furthermore the pressure medium, now functioning as a lubricant and coolant, can also be used for lubricating and cooling the adjacent planetary gearset 15 as indicated by arrows in FIG. 1.

Accordingly, no additional lubricant and coolant supply is needed for the bearing 17 and the planetary gearset 15. The shifting claw 2a can be connected to the sun gear 14 of the associated planetary gearset 15 by means of the common coupling teeth 16, so that the sun gear 14 is held fixed on the housing.

Figure 2:
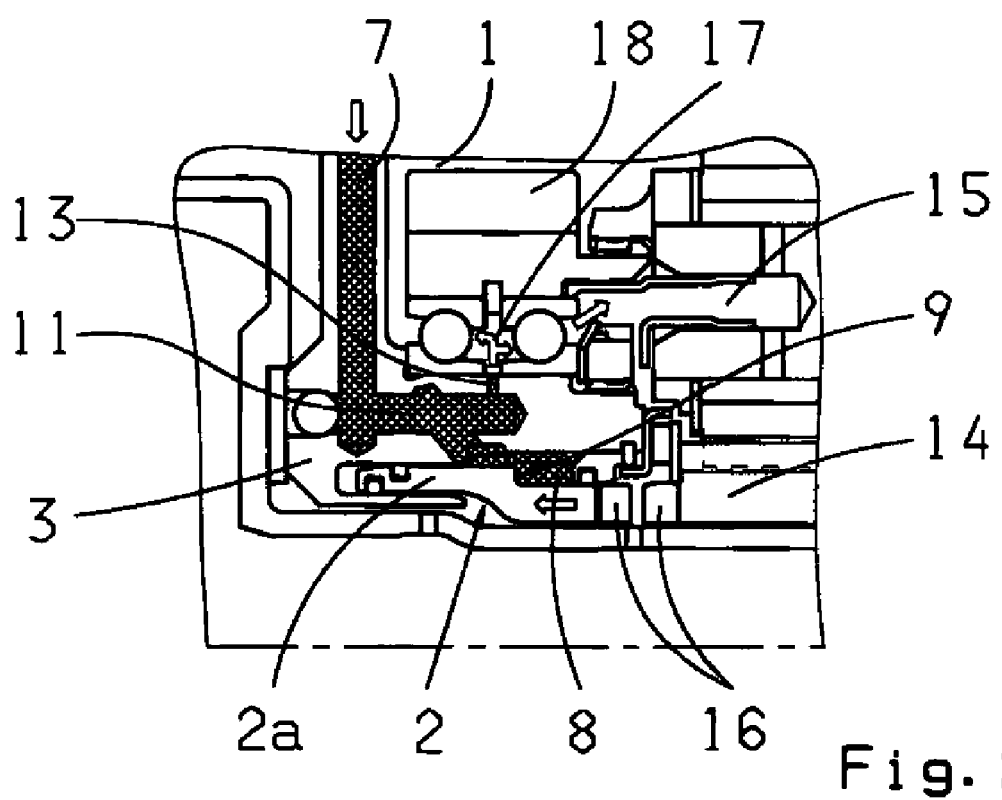
FIG. 2: Schematic, sectioned partial view of the arrangement with the shifting element according to FIG. 1 in a position decoupled from the component.

FIG. 2 shows the decoupled or disengaged position of the shifting element 2. In this position the shifting claw 2a is pushed to the left in the plane of the drawing, so that the common coupling teeth 16 between the shifting claw 2a and the sun gear 14 are disengaged. Accordingly, the sun gear 14 is now not fixed. This position is reached when pressure medium is passed via the second supply duct 7 into the associated pressure space 8 to act upon the second surface 9 of the shifting claw 2a. In this position too, pressure medium can also be delivered to the bearing 17 of the gearwheel 18 through the axial duct section 11 and the associated duct 13.

By virtue of the pressure medium branching enabled by the ducts 12, 13, lubrication and cooling of the bearing points in the transmission by the pressure medium used for the hydraulic actuation of the shifting element 2 is ensured at all times, since pressure medium 13 is being supplied either to the first supply duct 4 for engaging the shifting element 2 or to the second supply duct 7 for disengaging it.

The invention, described here considering the example of a claw clutch, can also be used in combination with other designs of a shifting element actuated hydraulically on both sides. Thus for example, the shifting element can be in the form of an interlocking brake or a frictional shifting element configured as a disk clutch, conical clutch, disk brake or conical brake.

In addition or alternatively to the supply of bearings in the transmission, the continuous branching of pressure medium can also be used for the lubrication and/or cooling of other transmission components such as the disks of some other shifting element.

INDEXES

1 Housing
2 Shifting element
2a Shifting claw
3 Bearing support
4 First supply duct
5 Pressure space
6 First surface to be acted upon by pressure
7 Second supply duct
8 Pressure space 9 Second surface to be acted upon by pressure
10 Axially extending duct section
11 Axially extending duct section
12 Duct
13 Duct
14 Sun gear
15 Planetary gearset
16 Clutch teeth
17 Bearing
18 Gearwheel
19 Spline teeth

The invention claimed is:

1. An arrangement with at least one shifting element (2) arranged in a housing (1) of a transmission which is hydraulically actuated with pressure medium from a pressure medium supply for a purpose of being coupled to and also decoupled from at least one component of the transmission,
wherein the pressure medium supply to the shifting element (2) is additionally used for a continuous supply of at least one of lubricant and coolant to at least one other structural element within the housing (1) of the transmission, and the shifting element (2) is acted upon by the pressure medium, through a first supply duct (4), to couple the shifting element (2) and, through a second supply duct (7), to decouple the shifting element (2), and together the first and the second supply ducts (4, 7) continuously supply the lubricant and the coolant to at least one bearing located within the housing (1) of the transmission.

2. The arrangement according to claim 1, wherein each of the first and the second supply ducts (4, 7) is connected to a same bearing point in the housing (1) by at least one duct (12, 13) for at least one of lubricating and cooling the bearing.

3. The arrangement according to claim 1, wherein the first supply duct (4) couples the pressure medium supply to a first pressure space (5) associated with a first surface (6) of the shifting element (2) to be acted upon, and the second supply duct (7) couples the pressure medium supply to a second pressure space (8) associated with a second surface (9) of the shifting element (2) to be acted upon, and the first and the second supply ducts (4, 7) pass radially through a bearing support (3).

4. The arrangement according to claim 3, wherein the radially extending supply ducts (4, 7) are arranged in the circumferential direction of the bearing support (3) and offset relative to one another, and have respective duct sections (10, 11) which extend axially and which are connected to an associated duct (12, 13) for lubricating and cooling the bearing.

5. The arrangement according to claim 1, wherein the shifting element (2) is an interlocking shifting element.

6. The arrangement according to claim 5, wherein the shifting element (2) and the component of the transmission are connected to one another by a common coupling tooth system (16).

7. The arrangement according to claim 1, wherein the shifting element is a frictional shifting element.

8. The arrangement according to claim 1, wherein the component of the transmission is a sun gear (14) of a planetary gearset (15) of an automatic transmission with a planetary structure.

9. An arrangement with at least one shifting element (2) arranged in a housing (1) of a transmission which is hydraulically actuated with pressure medium from a pressure medium supply for a purpose of being coupled to and also decoupled from at least one component of the transmission,
wherein the pressure medium supply to the shifting element (2) is additionally used for a continuous supply of at least one of lubricant and coolant to at least one other structural element within the housing (1) of the transmission, and the shifting element (2) is located substantially radially inside a bearing support (3) of the transmission.

10. The arrangement according to claim 9, wherein the shifting element (2) is connected to the bearing support (3) in a rotationally fixed manner and is axially slidable by spline teeth (19).

* * * * *